Nov. 12, 1940.  G. KONICEK  2,221,401
FERTILIZER DISTRIBUTOR
Filed April 4, 1938
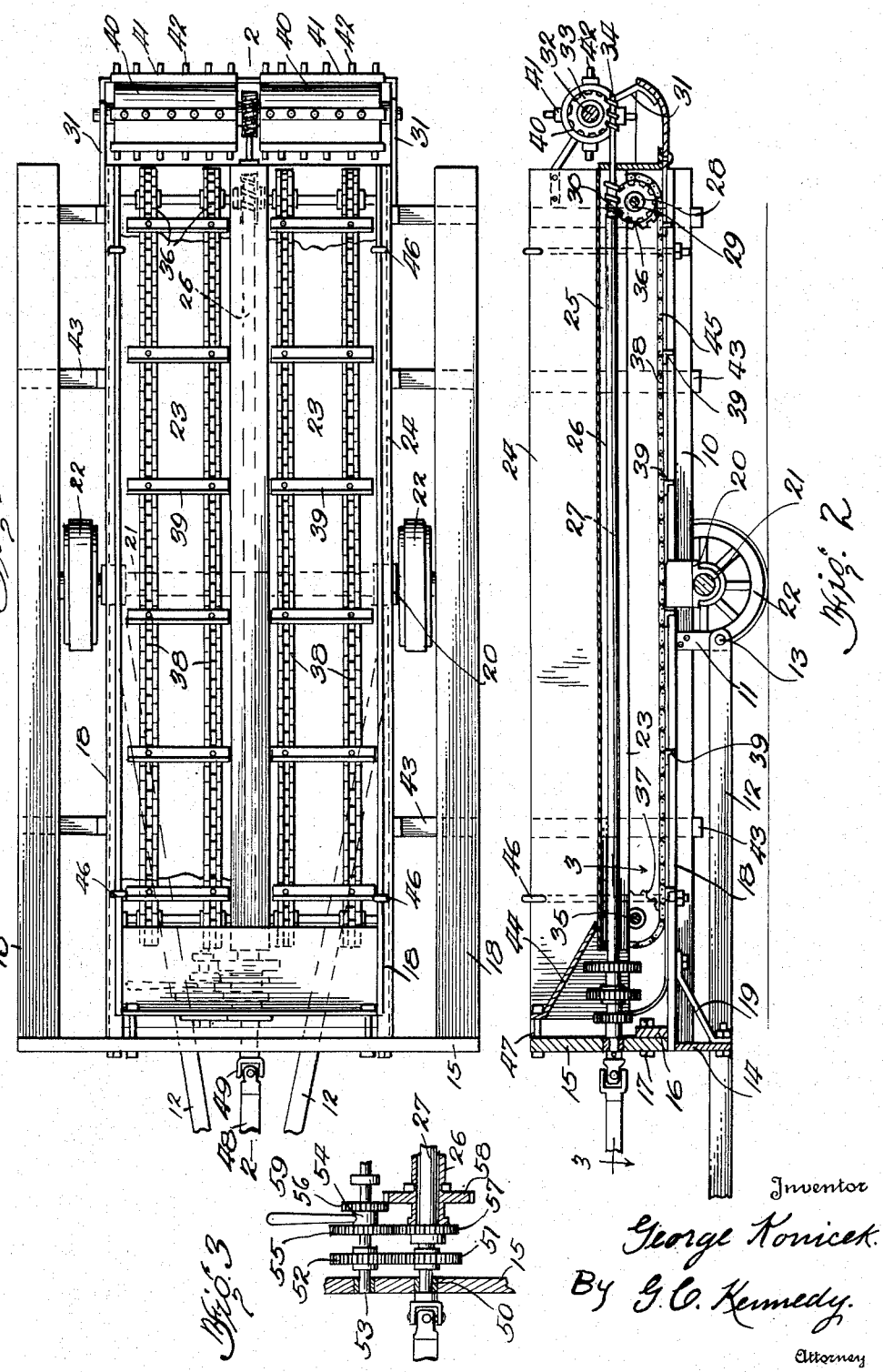
Inventor
George Konicek.
By G. C. Kennedy.
Attorney Patented Nov. 12, 1940

2,221,401

UNITED STATES PATENT OFFICE 2,221,401

FERTILIZER DISTRIBUTOR

George Konicek, Bruce Township, Benton County, Iowa

Application April 4, 1938, Serial No. 199,759

2 Claims. (Cl. 275—5)

My invention pertains to improvements in fertilizer distributors, and one object of my improvements is to provide coacting and divisionally separated paired distributing and carrier means, for evenly discharging material from a receptacle upon separate but associated distributing devices at one end thereof.

Another object of my improvements is to supply means to adjustably vary the speed of said distributing and carrier means, according to the kind of load to be distributed.

Another object of my improvements is to mount upon the under part of the receptacle longitudinal paired skids whereby the receptacle may be removably positioned upon a tilting cart for transportation and for sliding removal therefrom for subsequent convenient storage when not in use.

This invention consists in general of certain novel details of construction and combinations of parts hereinafter fully described, illustrated in the accompanying drawing and particularly pointed out in the appended claims.

In the accompanying drawing like characters of reference indicate like parts in the several views, and—

Figure 1 is a plan view of the invention as supported on a wheeled vehicle.

Figure 2 is a section on the median line 2—2 of Figure 1.

Figure 3 is a fragmentary section, partially in elevation, on the line 3—3 of Figure 2.

In the embodiment of the invention as here shown there is also disclosed a wheeled vehicle for carrying the structure which forms the invention to which the present application is directed. Briefly this wheeled vehicle includes a pair of laterally spaced and longitudinally extending side frame members 10. Depending from each of the members 10, somewhat forward of its longitudinal center, is a bracket or hanger 11. These brackets or hangers 11 have the rear ends of traction beams 12 pivotally mounted thereto as at 13. The forward ends of the members 10 are connected by a depending transverse plate 14. Also the side members 10 are connected at their forward ends by a front wall 15 which extends laterally on each side beyond the members 10 and is bolted securely to a transverse member 16 as at 17. Similarly the member 14 extends laterally beyond the members 10 at each side. The members 10 support the inner edges of working platforms or floors 18 which project laterally from the frame of the vehicle and are braced thereto by braces 19. This vehicle frame has its side members provided with longitudinally slidable bearings 20 wherein is journalled an axle 21 carrying supporting wheels 22.

On this vehicle frame is mounted a wagon-body having a floor 23 and at each side of this floor is provided an upstanding side wall 24. The floor 23 is arched at its middle portion as at 25 and in this arched portion is mounted a hollow shaft 26 wherein is mounted a longitudinal shaft 27. Extending transversely of the device adjacent the rear end thereof is a shaft 28 which is journalled in the side walls 24. On the shaft 28 is fixed a worm wheel 29 which meshes with a worm 30 fixed on the hollow shaft 26. Extending rearwardly from the side walls is a pair of brackets 31 and toward the rear ends of these brackets are journalled the ends of a shaft 32 on which is fixed a worm wheel 33 which meshes with a worm 34 on a rearward extension of the shaft 27. An idler shaft 35 extends across the forward end of the body and has its ends journalled in the side members 24. At each side of the floor arch the shaft 28 carries a pair of sprocket wheels 36 and similarly the shaft 35 is provided with two pairs of sprocket wheels 37. Chains 38 are trained around these sprocket wheels and carry flights 39. The floor 23, of course, terminates at its front and rear edges in such relation to the shafts 28 and 35 that the upper runs of these chains may move rearwardly over the floor 23 to deliver material to the rear end of the body while the lower runs of these chains move forwardly beneath the floor 23.

The shaft 32 carries a pair of drums 40 provided with ribs or bars 41 each carrying teeth 42. These drums serve to pick up and discharge the material delivered to the rear of the body by the conveyors formed by the chains 38 and flights 39.

It will be observed that a person may stand on one of the outer floor portions 18, these being supported by brackets 43 from the members 10, to assist in the delivery of the material rearwardly by use of a suitable implement such as a pitch-fork.

At its forward end the body is provided with a transversely extending and rearwardly inclined front wall 44 so arranged and positioned as to guard against loss of material at the front of the body. At each lateral edge of the body there is provided a skid 45, having upturned forward and rear ends, the latter being supported by the brackets 31. The skids rest on the floor 18 at the side frame members 10 and permit the ready placement and removal of the body when it is desired to use the vehicle frame as here shown or for some other purpose. The body is secured removably to the vehicle frame by clamp bolts 46 at its sides and, if desired, by bolts 47 connecting the upper parts of the front members 15 and 44.

At the forward end of the body there is provided variable speed gearing driven from a drive shaft 48, actuated from a tractor, through a universal joint 49. This gearing includes a driven shaft 50 connected to the joint 49 and fixed in a socket in the end of shaft 27. On the shaft 50 is fixed a gear 51 which meshes with a gear 52 fixed on a jack-shaft 53. On the jack-shaft 53 is splined a sleeve 54 carrying gears 55 and 56, the latter being of less diameter than the former. On the shaft 26 is fixed a pair of gears 57 and 58. The spacing of the gears 55 and 56 is different from that of the gears 57 and 58 so that if the gear 55 is in mesh with the gear 57 the gear 56 will be out of mesh with the gear 58, the reverse being true when the gear 56 meshes with the gear 58. The gears 55 and 56 may be shifted by means of an ordinary shifter lever or arm 59.

This change speed gearing is attached to the removable body in any desired manner to be removed therewith. The details of the manner of attachment are not here deemed necessary to be shown as they form no part of the present invention.

In operation the shaft 48, being driven from the tractor will have its speed of rotation in accordance with the tractor drive but the relative speed of the conveyors and distributor drums is controlled by the change speed gearing. For instance, if the gears 55 and 57 be brought into mesh the speeds of the shaft 27 and hollow shaft 26 will be, in the form shown, equal while, if the gears 56 and 58 mesh the hollow shaft 26 will rotate slower than the shaft 57.

I claim:

1. In a fertilizer distributor, a wagon-body having an open rear end, a transversely spaced pair of beater-drums on a common shaft and mounted across said open end, a medially positioned driving-shaft longitudinally traversing the wagon-body, meshed worm-gearing mounted respectively on the rear part of the driving-shaft and the beater-drum shaft, endless traveling aprons mounted longitudinally about the bottom of the wagon-body on a transverse rotary shaft mounted across the rear part of the wagon-body and another transverse rotary shaft across the front part of said wagon-body, a rotatable hollow shaft surrounding said driving shaft, a worm-gearing between the rear part of the hollow shaft and said rear transverse shaft, and driving connections between said driving shaft and hollow shaft.

2. In a fertilizer distributor, a wagon-body having an open rear end, a transversely spaced pair of beater-drums on a common shaft and mounted across said open end, a medially positioned driving-shaft longitudinally traversing the wagon-body, meshed worm-gearing mounted respectively on the rear part of the driving-shaft and the beater-drum shaft, a transversely spaced pair of endless traveling aprons mounted longitudinally about the bottom of the wagon-body on a transverse rotary shaft mounted across the rear part of the wagon-body and another transverse rotary shaft across the front part of said wagon-body, a rotatable hollow shaft surrounding said driving-shaft, a worm gearing between the rear part of the hollow shaft and said rear transverse shaft, speed-changing gearing operatively mounted between said driving shaft and hollow shaft for alternately varying the speed of rotation of the hollow shaft relatively to the driving-shaft, and a medially spaced longitudinally extending arched portion in the wagon-body having side walls extending along opposite sides of the said last mentioned shafts to the rear of the speed-changing gearing, to isolate the aprons from each other in delivering their loadings upon the beater-drums to the rear thereof.

GEORGE KONICEK.